US008834945B2

(12) United States Patent
Kane et al.

(10) Patent No.: US 8,834,945 B2
(45) Date of Patent: *Sep. 16, 2014

(54) GRANULATED PHOSPHATE PRODUCT CONTAINING ABRASIVITY AND LUBRICITY ADDITIVES

(75) Inventors: Matthew T. Kane, Lakeland, FL (US);
Eddy Fontana, Lithia, FL (US);
Lawrence Alan Peacock, Riverview, FL (US); Robert C. Fredere, Lakeland, FL (US); David Lee, Minnetonka, MN (US); Charlotte Brittain, Tampa, FL (US); Andrea Williams, Riverview, FL (US); Pat Connors, Tampa, FL (US);
Kai Hamang, Brandon, FL (US)

(73) Assignee: MOS Holdings Inc., Plymouth, MN (US)

( * ) Notice: Subject to any disclaimer, the term of this patent is extended or adjusted under 35 U.S.C. 154(b) by 473 days.

This patent is subject to a terminal disclaimer.

(21) Appl. No.: 13/184,086

(22) Filed: Jul. 15, 2011

(65) Prior Publication Data

US 2011/0293792 A1 Dec. 1, 2011

Related U.S. Application Data

(63) Continuation-in-part of application No. 13/078,557, filed on Apr. 1, 2011, now Pat. No. 8,012,519, which is a continuation of application No. 13/008,640, filed on Jan. 18, 2011, now abandoned.

(60) Provisional application No. 61/295,463, filed on Jan. 15, 2010.

(51) Int. Cl.
A23K 1/175 (2006.01)
A23K 1/18 (2006.01)
A23K 1/00 (2006.01)

(52) U.S. Cl.
CPC .............. A23K 1/002 (2013.01); A23K 1/1826 (2013.01); A23K 1/1755 (2013.01); A23K 1/1756 (2013.01); A23K 1/1751 (2013.01); Y10S 426/805 (2013.01); Y10S 426/807 (2013.01)
USPC .............................. 426/74; 426/805; 426/807

(58) Field of Classification Search
USPC ........................................ 426/74, 805, 807
See application file for complete search history.

(56) References Cited

U.S. PATENT DOCUMENTS

| 3,079,260 | A | | 2/1963 | Galler |
| 3,134,719 | A | | 5/1964 | Sheth et al. |
| 3,189,433 | A | * | 6/1965 | Hollingsworth et al. ......... 71/37 |
| 3,266,886 | A | | 8/1966 | Middleton |
| 3,441,511 | A | * | 4/1969 | Otrhalek et al. .............. 510/444 |
| 3,897,575 | A | | 7/1975 | White |
| 3,931,416 | A | | 1/1976 | Grams |
| 4,101,636 | A | * | 7/1978 | Larson et al. ................. 423/305 |
| 4,115,307 | A | | 9/1978 | McGilvery |
| 4,180,485 | A | | 12/1979 | Llenado |
| 4,873,111 | A | | 10/1989 | Aaltonen et al. |
| 4,994,282 | A | | 2/1991 | Miller |
| 5,066,441 | A | | 11/1991 | Gerald |
| 5,643,622 | A | | 7/1997 | Sawhill |
| 5,935,625 | A | | 8/1999 | Hjørnevik et al. |
| 6,113,974 | A | | 9/2000 | Winowiski et al. |
| 8,012,519 | B2 | | 9/2011 | Kane et al. |
| 2003/0190390 | A1 | | 10/2003 | Moore |
| 2005/0163911 | A1 | | 7/2005 | McGowen et al. |
| 2006/0141098 | A1 | | 6/2006 | Persson et al. |
| 2006/0147546 | A1 | | 7/2006 | Ferlin et al. |
| 2006/0170128 | A1 | | 8/2006 | Belanger et al. |
| 2008/0241227 | A1 | | 10/2008 | Franz et al. |
| 2011/0177204 | A1 | | 7/2011 | Kane et al. |

FOREIGN PATENT DOCUMENTS

| CN | 1140555 A | | 1/1997 |
| CN | 1684757 A | | 10/2005 |
| EP | 0090995 | | 10/1983 |
| EP | 175805 A | * | 4/1986 |
| EP | 0809941 A1 | | 3/1997 |
| GB | 1070668 | | 6/1967 |
| GB | 1275280 | | 5/1972 |
| GB | 1498285 | | 1/1978 |
| GB | 2129410 A | | 5/1984 |
| GB | 2332426 A | | 6/1999 |
| JP | 5184309 A | | 7/1993 |
| JP | 2005281732 A | | 10/2005 |
| SU | 1740357 A1 | * | 6/1992 |
| WO | WO 2006/034098 A1 | | 3/2006 |
| WO | WO 2007/004967 | | 1/2007 |

OTHER PUBLICATIONS

Machine translation of EP0175805, 11 pages.*
"Phosphate Rock" downloaded from www.mineralseducationcoalition.org/minerals/phosphate-rock, 2 pages dated Mar. 2003.*
"Triple Superphosphate" downloaded from www.techsheets.simplot.com/Plant$_{13}$ Nutrients/12030_TSP0-45-).pdf, 2 pages dated Mar. 2003.*

(Continued)

Primary Examiner — Chhaya Sayala
(74) Attorney, Agent, or Firm — Patterson Thuente Pedersen, P.A.

(57) ABSTRACT

A granulated phosphate composition that provides sufficient nutritional value as well as enhanced pelleting benefits, such as abrasiveness and lubricity, compared to other granulated phosphate feed products. The granulated phosphate composition includes a phosphate source, such as monocalcium phosphate, mono-dicalcium phosphate, or dicalcium phosphate, and one or more additives such as lubricity and abrasivity additives. The lubricity additive can include a sodium additive that lubricates the die during a feed milling or pelleting process. The abrasivity additive can include silica or sand that scours the die during the pelleting process. The increased lubricity and abrasivity attributes of the composition benefits die throughput and efficiency in the pelleting process, without compromising nutritional value in the final feed product.

16 Claims, No Drawings

(56) References Cited

OTHER PUBLICATIONS

Cheremisinov, "Superphosphate", downloaded from http://encyclopedia2.thefreedictionary.com/Superphosphate, The Great Soviet Encyclopedia, 3rd Edition (1970-1979) Incorporated in the Office action.*

Office Action dated Dec. 26, 2013 for Chinese Application No. 201180005753.6 filed Jan. 18, 2011, 14 pages.

Application and File history for U.S. Appl. No. 13/008,640, filed Jan. 18, 2011. Inventors: Matthew T. Kane et al.

Application and File history for U.S. Appl. No. 13/078,557, filed Apr. 1, 2011. Inventors: Matthew T. Kane et al.

A document entitled "Animal Feeds Granulation", 2010, http://feeco.com/uploads/project-profiles/animal-feeds-granulation.pdf, 1 page.

Biofos® Product Specification, The Mosaic Company, Dec. 18, 2009, 1 page.

Multifos® Product Specification, The Mosaic Company, May 4, 2009, 1 page.

PCT Search Report dated Oct. 20, 2011 for PCT Application No. PCT/US2011/021565 filed Jan. 18, 2011, 8 pages.

PCT Search Report dated Jan. 25, 2013 for PCT Application No. PCT/US2012/044526 filed Jun. 28, 2012, 11 pages.

Office Action dated Mar. 28, 2013 for Chinese Application No. 201180005753.6 filed Jan. 18, 2011, 19 pages.

* cited by examiner

US 8,834,945 B2

GRANULATED PHOSPHATE PRODUCT CONTAINING ABRASIVITY AND LUBRICITY ADDITIVES

RELATED APPLICATION

The present application is a continuation-in-part of U.S. patent application Ser. No. 13/078,557, now U.S. Pat. No. 8,012,519 entitled "GRANULATED MONOCALCIUM PHOSPHATE PRODUCT CONTAINING ABRASIVITY AND LUBRICITY ADDITIVES," filed Apr. 1, 2011, which is a continuation of U.S. patent application Ser. No. 13/008,640 entitled "GRANULATED MONOCALCIUM PHOSPHATE PRODUCT CONTAINING ABRASIVITY AND LUBRICITY ADDITIVES," filed Jan. 18, 2011, which claims the benefit of U.S. Provisional Application No. 61/295,463 entitled "GRANULATED MONOCALCIUM PHOSPHATE PRODUCT CONTAINING ABRASIVITY AND LUBRICITY ADDITIVES," filed Jan. 15, 2010, each of which are hereby incorporated by reference in their entireties.

FIELD OF THE INVENTION

The present invention generally relates to additives for animal feed, and more particularly a phosphate composition exhibiting enhanced feed milling performance without compromising nutritional value.

BACKGROUND OF THE INVENTION

Animal and poultry feed, generally known as compound feed, are feedstuffs that are blended from various raw materials and additives. Compound feeds can be prepared as complete feeds that provide all the daily required nutrients, as concentrates that provide a part of the ration (protein, energy), or as supplements that provide additional micro-nutrients such as minerals and vitamins. A main ingredient used in commercially prepared feed is feed grains such as, for example, corn, soybeans, sorghum, oats, barley, and combinations thereof.

An important industry within the animal feed industry further includes the sale and manufacture of premixes. Premixes can be composed of micro-ingredients for blending into commercial or individually-produced rations to produce animal feed. Micro-ingredients can include nutrients, vitamins, minerals, chemical preservatives, antibiotics, fermentation products, and other essential ingredients.

A source of phosphorous and calcium is commonly added to animal feed as a micro-ingredient. One example of such ingredient that can be used in animal feed is Biofos®. Biofos® is a feed-grade monocalcium phosphate that is produced by reacting calcium carbonate and wet process defluorinated phosphoric acid. Biofos® is a source of highly available phosphorous (P) and calcium (Ca) with a narrow calcium-to-phosphate ratio, such that it helps meet animal and poultry requirements for these essential nutrients. For example, Biofos® guarantees minimum 21% phosphorous content which allows for flexibility and economy in formulations. Biofos® also provides ease of handling and uniform dispersion in mixed feeds and minerals.

Another example micro-ingredient used as a source for phosphorous and calcium in animal feed is Multifos®. Multifos® is a feed-grade tricalcium/defluorinated phosphate, which is derived from phosphate rock in a carefully controlled thermochemical process that enhances biological availability, drives off fluorine, and physically conditions the product for feed mixing. Like Biofos®, Multifos® is a source of highly available phosphorous (P) and calcium (Ca), as well as sodium (Na) that will help provide animal and poultry requirements for these nutrients. For example, Multifos® guarantees minimum 18% phosphorous content which again allows flexibility in feed formulation.

Feed blends are formulated according to specific requirements of a target animal. Feed manufactures or compounders prepare the blends by buying the commodities and blending them in a feed mill according to specifications provided by a nutritionist, for example. The blends can be manufactured by feed compounders as meal type, pellets, or crumbles.

One type of feed mill found in the industry for producing feed blends is a pellet mill, which blends a mixture of dry powdered feedstock, such as, for example, flour or grass, a wet ingredient, such as steam or molasses, and any other ingredients, such as micro-ingredients. The dry feedstock, wet ingredient, and any other ingredients are combined to form a mash or meal. The mash or meal is then compacted into an interior of a round die that contains many small holes. The mash or meal is compacted within the die thereby forcing it out of the holes in the form of pellets.

Feed mill or pellet mill performance, such as throughput and efficiency, is of great importance to feed manufacturers and can be impacted by a number of variables including the characteristics of the feed ingredients. Good die performance is essential for enhancing throughput, decreasing energy consumption, and increasing efficiency. However, product buildup can reduce the performance of the die and can sometimes require a separate die-cleaning step. This cleaning step can be time consuming, requiring disassembly and reassembly of the die in addition to cleaning of the die. Further, the die may need to be replaced frequently, which can add manufacturing expense to the pelleting process.

Certain commercially available ingredients exhibit attributes that provide enhanced pelleting benefits, such as reduced product buildup, for improved throughput and efficiency. For example, Multifos® provides enhanced non-P benefits over Biofos® and other competing mineral supplements, such as enhanced throughput, die wear reduction, energy efficiencies, and pellet quality which results in reduced costs of purchasing, storing, and handling.

However, even with its pelleting benefits, due to the cost of manufacturing tricalcium phosphate, it is typically more expensive to use tricalcium phosphates such as Multifos® rather than monocalcium phosphates or dicalcium phosphates. Multifos®, as well as other tricalcium phosphates, are currently manufactured using a rotary kiln process, rather than the less expensive granulation process used to make Biofos®. Typical rotary kiln processes tend to have higher operating costs than granulation processes due to higher energy consumption. Additionally, the phosphate rock used in the manufacture of Multifos® is subject to significant fluctuations in price, and is more expensive than the raw materials used to make Biofos®.

For some pellet mill operators, this increased expense outweighs the enhanced benefits in milling operations. Therefore, there remains a need for a phosphate ingredient for animal feed with enhanced milling benefits without significantly increasing manufacturing costs or compromising nutritional benefits.

SUMMARY OF THE INVENTION

Embodiments of the present disclosure are directed to a granulated phosphate composition for incorporation into animal and poultry feed that provides sufficient nutritional value including phosphorous, calcium and sodium availability, as well as enhanced pelleting benefits, such as abrasiveness and lubricity, compared to the granulated phosphate compositions currently available on the market. More particularly, the compositions of the embodiments of the present invention provide similar or better nutritional value than other feed-grade micro-ingredients, such as a Multifos® or Biofos® product, in combination with similar or better milling benefits typically exhibited in tricalcium phosphate, such as a Multifos® product. Further, the compositions of the embodiments are manufactured using a granulation process as opposed to a more expensive rotary kiln process.

In particular, the compositions of the embodiments provide a level of abrasiveness and lubricity that in turn provide pellet mill efficiencies comparable to or better than these benefits exhibited by the existing tricalcium phosphate products such as Multifos® without compromising nutritional benefits found in the final feed formulations utilizing existing feed-grade micro-ingredients, such as Biofos® and Multifos®.

In some aspects, the compositions of embodiments of the present invention can include a granulated phosphate feed ingredient composition comprising a phosphate source such as monocalcium phosphate, mono-dicalcium phosphate, dicalcium phosphate, or combinations thereof, and a sodium additive present in an amount that provides a sodium content of about one to about ten percent by weight of the composition. The sodium additive can comprise, for example, sodium carbonate, sodium hydroxide, monosodium phosphate, potash, or combinations thereof.

In other aspects, the compositions of embodiments of the present invention can include a granulated phosphate feed ingredient composition comprising a phosphate source such as monocalcium phosphate, mono-dicalcium phosphate, dicalcium phosphate, or combinations thereof, and an abrasive or abrasivity additive in an amount of about one to about ten percent by weight of the composition. The abrasive additive can comprise, for example, silica, such as silica sand.

In yet other aspects, the compositions of embodiments of the present invention can include a granulated phosphate composition for use as a feed ingredient in animal feed, wherein the animal feed is pelleted via a pellet mill, the granulated phosphate composition comprising a phosphate source such as monocalcium phosphate, mono-dicalcium phosphate, dicalcium phosphate, or combinations thereof, an abrasive additive to scour a die of the pellet mill during pelleting, and a lubricity additive to generate sodium phosphate to lubricate the die during pelleting.

The above summary of the invention is not intended to describe each illustrated embodiment or every implementation of the present invention. The detailed description that follows more particularly exemplifies these embodiments.

DETAILED DESCRIPTION

In one embodiment of the present invention, a granulated phosphate product or composition includes a phosphate source such as monocalcium phosphate, mono-dicalcium phosphate, dicalcium phosphate, or combinations thereof, and one or more additives. The one or more additives can provide product attributes, such as, for example, lubricity and abrasivity, in a subsequent pelleting process that are similar or better than the current attributes exhibited in existing tricalcium phosphate products, such as Multifos®. Additionally or alternatively, the one or more additives can provide nutritional attributes, such as, for example, sufficient availability of phosphorous, calcium, and/or sodium, in a final feed formulation that are similar to or exceed those currently exhibited by the addition of existing feed-grade micro-ingredients, such as Multifos® and Biofos® to the final feed formulation.

As discussed in the Background section, a pelleting mill utilizes a die with a number of holes, and it is favorable to keep the holes of the die and its interior surface free or substantially free from product buildup during the compaction to increase throughput and efficiency. Product buildup can be reduced by increasing the lubricity of the meal or mash, and/or by increasing the abrasivity of the meal or mash such that the die is cleaned or scoured during use, thereby reducing or eliminating the need for a separate die cleaning step. In addition, these additives must be safe for addition into a final feed product and for consumption by the target animal.

In one embodiment of the invention, the phosphate composition includes one or more additives having lubricity attributes (hereinafter "lubricity additives"). Lubricity is a product attribute that helps lubricate the dies in pelleting mills to prevent or reduce product buildup, thereby increasing throughput and efficiency. Lubricity additives can include, for example, a sodium additive, such as sodium carbonate or soda ash, sodium hydroxide or caustic soda, monosodium phosphate, potash, or combinations thereof. The sodium additive, such as a carbonate or hydroxide, generates sodium phosphate in the phosphate composition that lubricates the die during pelleting, thereby increasing die efficiency and throughput. Lubricity additives, and particular sodium additives, can be present in the phosphate composition in an amount sufficient such that the total phosphate composition comprises from about 1 to about 10% Na by weight, and more particularly from about 3 to about 5% Na by weight of the phosphate composition.

In another embodiment of the invention, the phosphate comprises, either separately or in addition to the lubricity additives, one or more additives having abrastivity attributes (hereinafter "abrasivity additives" or "abrasive additives") that can provide a scouring effect for pellet die cleansing. Abrasivity is a product attribute that helps scour and keep the die clean during milling. Abrasivity additives can include silica sand, diatomite (diatomaceous earth), or combinations thereof. Abrasivity additives can be present in the phosphate composition in an amount such that the total product comprises from about 1 to about 10% Si, and more particularly about 2 to about 4% Si by weight of the phosphate composition before pelleting.

The phosphate composition should also provide sufficient nutrients to the final feed product for consumption by the target animal. In one embodiment of the present invention, the phosphate composition includes minimum phosphorous content of about 21% P, and a minimum sodium content of 4% Na. Furthermore, the phosphate composition can closely resemble the currently available Biofos® product in that the phosphate composition comprises a calcium content in a range from about 15% to about 30%, a maximum fluorine content of about 0.21%, a bulk density of about 56-59 lbs/ft$^3$, a moisture content of about 1%, and a pH of about 3.6. A sieve analysis using a Tyler mesh scale, in which the mesh size is the number of openings per (linear) inch of mesh, can also resemble the Biofos® product, wherein 99.7% of the granules pass a 12 Mesh screen, 88% pass a 16 Mesh screen, 73.4% pass a 20 Mesh screen, and 1.0% pass a 100 Mesh screen.

In another embodiment of the invention, the phosphate composition includes minimum phosphorous content of about 18% P, and a minimum sodium content of 4% Na. Furthermore, the phosphate composition can closely resemble the currently available Multifos® product in that the phosphate composition comprises a calcium content in a range from about 30% to about 34%, a maximum fluorine content of about 0.18%, a bulk density of about 82-85 lbs/ft$^3$, a moisture content of about 0.6%, and a pH of about 6.0. A sieve analysis using a Tyler mesh scale, in which the mesh size is the number of openings per (linear) inch of mesh, can also resemble the Multifos® product, wherein 98.1% of the granules pass a 12 Mesh screen, 4.9% pass a 100 Mesh screen, and 1.2% pass a 200 Mesh screen.

The phosphate composition of embodiments of the present invention, such as monocalcium phosphate (MCP) can be manufactured by reacting calcium carbonate with wet process defluorinated phosphoric acid, similar to the Biofos® product with the addition of one or more additives to the product stream either before or during granulation. The composition is granulated using traditional granulation processes, such as wet or dry granulation, with slight modifications for the addition of one or more additives to the product stream.

Feed Milling Performance Evaluation #1

Two studies, Study 1 and Study 2, were conducted to evaluate the effects of Biofos®, Multifos®, and two experimental feed phosphates on various feed milling parameters. Experimental protocol and nutrient composition of Broiler Grower diet were used in both studies and were designed similarly, including the use of silica as an abrasivity additive in a monocalcium phosphate composition. The Broiler Grower feeds were composed of corn, soybean, 5 wt % DDGS (Distiller's Dried Grains with Solubles), 5 wt % meat and bone meal, and inorganic phosphates. The only differences between Study 1 and Study 2 were the ingredient composition: Study 1 included inorganic phosphates, meat and bone meal, and DDGS being the primary contributors of available phosphorous with no phytase; Study 2 included a phytase to contribute approximately 25% of required phosphorous, or 0.10% of available P in the diet.

Product A includes commercially available Biofos® as the feed phosphate, while Product B includes commercially available Multifos® as the feed phosphate. Products A and B do not contain either a lubricity or an abrasivity additive.

Product C includes a monocalcium phosphate (MCP) composition as the feed phosphate incorporating soda ash as the lubricity additive, which is present in the amount of about 3.8% Na by weight of the MCP composition. Silica sand is present as an abrasivity additive in the amount of about 2.86% Si by weight of the MCP composition.

Product D includes a monocalcium phosphate (MCP) composition as the feed phosphate incorporating caustic soda as the lubricity additive, which is present in the amount of about 3.76% Na by weight of the MCP composition. Silica sand is present as an abrasivity additive in the amount of about 2.63% Si by weight of the MCP composition.

The feed manufacturing equipment included a Roskamp Champion hammermill equipped with a #8 and #8 screen for milling the grain, and a Hayes & Stolz Counterpoise ribbon mixer. The pellet mill was a 1 ton/hr. mill available from California Pellet Mill Co. with a die size of 1 1/64" by 1 3/4". A counter flow cooler was also used, available from Geelen Counterflow USA, Inc.

The milling parameters that were measured include feed production, horse power, feed production per horsepower-hour, pellet temperature, and pellet durability indices (PDI).

Table 1 illustrates the measured parameters for Study 1, while Table 2 indicates the percent change of the experimental products for certain parameters as compared to the Biofos® product and the Multifos® product. Table 3 illustrates the measured parameters for Study 2, while Table 4 indicates the percent change of the experimental products for certain parameters as compared to the Biofos® product and the Multifos® product.

TABLE 1

Study 1 -- Effect on Parameters

| | Product | | | |
|---|---|---|---|---|
| | A | B | C | D |
| Study 1 | Biofos® (Product A) | Multifos® (Product B) | Soda Ash (Product C) | Caustic Soda (Product D) |
| Feed Prod./Hr | 1556 lbs. | 1747 lbs. | 1938 lbs. | 1575 lbs. |
| Lbs./HP * Hr | 193 lbs. | 212 lbs. | 233 lbs. | 195 lbs. |
| Horse Power | 8.05 | 8.23 | 8.33 | 8.1 |
| PDI | 89.6% | 85.8% | 84.3% | 86.0% |
| Modified PDI | 63.1% | 52.9% | 51.1% | 60.8% |
| Pellet Temp. (Cond.) | 174.6 F. | 177.7 F. | 178.0 F. | 175.7 F. |
| Pellet Temp. | 185 F. | 186 F. | 186 F. | 185 F. |

TABLE 2

Study 1 -- % Change

| | Feed Prod./Hr | Lbs./HP * Hr |
|---|---|---|
| % Change from A | | |
| B | 12 | 10 |
| C | 24 | 21 |
| D | 1 | 1 |
| % Change from B | | |
| C | 11 | 10 |
| D | -9.8 | -8 |

TABLE 3

Study 2 -- Effect on Parameters

| | Product | | | |
|---|---|---|---|---|
| | A | B | C | D |
| Study 2 | Biofos® (Product A) | Multifos® (Product B) | Soda Ash (Product C) | Caustic Soda (Product D) |
| Feed Prod./Hr | 1481 lbs. | 1811 lbs. | 1965 lbs. | 2065 lbs. |
| Lbs./HP * Hr | 175 lbs. | 212 lbs. | 227 lbs. | 236 lbs. |
| Horse Power | 8.48 | 8.55 | 8.64 | 8.74 |
| PDI | 91.3% | 89.6% | 85.9% | 85.9% |
| Modified PDI | 72.4% | 68.9% | 58.6% | 60.2% |
| Pellet Temp. (Cond.) | 169.0 F. | 173.0 F. | 173 F. | 174 F. |
| Pellet Temp. | 182 F. | 184 F. | 183 F. | 184 F. |

TABLE 4

Study 2 -- % Change

| | Feed Prod./Hr | Lbs./HP * Hr |
|---|---|---|
| % Change from A | | |
| B | 22 | 21 |
| C | 32.7 | 29.7 |
| D | 39.4 | 34.8 |

TABLE 4-continued

Study 2 -- % Change

|  | Feed Prod./Hr | Lbs./HP * Hr |
|---|---|---|
| % Change from B | | |
| C | 8.5 | 7 |
| D | 14 | 11 |
| % Change from C | | |
| D | 5 | 4 |

It was discovered that the soda ash product (product C) provided the best overall results in Study 1 as measured by Lbs/Hp*hr, and provided better results than Multifos® and Biofos® in both Studies 1 and 2. Both the soda ash product (product C) and caustic soda product (product D) outperformed both Biofos® and Multifos® in Study 2, the caustic soda (product D) product performing the best. Ultimately, results from the two studies indicate that both soda ash and caustic soda products would provide better feed milling performance than Biofos®, and similar to improved performance than Multifos®.

Bioavailability Study

A 21 day bioassy was conducted to determine and evaluate the biological value, i.e. relative bioavailability, of different feed phosphates including Biofos®, Multifos®, a monocalcium phosphate soda ash formulation, and a monocalcium phosphate caustic soda formulation compared to a reference standard phosphate source.

It is known to use poultry bioassays to assign feed P sources a biological value (BV) instead of being expressed on a percentage available or retainable P basis. The BV of a feed or standard phosphate is determined by measuring weight gain, feed consumption, feed conversion, and percentage tibia ash after chicks or poults are fed varying amounts of test phosphates in a P-deficient bioassay diet for a two to three week period. The BV for feed phosphates are usually expressed as a relative BV (RBV) by comparing the BV of a test P source to a reference standard food grade P source.

One particular accepted measurement includes the Triple Response Method (Sullivan, 1966), used in the current study, for evaluating test P when determining the RBV by using data of bone ash weight, body weight gain, and feed efficiency. The RBV data for test P sources was also reported in relative numerical terms in comparison with a reference standard. During the current study, the body weights, feed consumption and feed conversion were measured during 0 to 21 days, and their averages were used in calculations. The tibia bone ash (2 birds per cage) was measured at 21 days.

In the current study, the test animals included male, broiler chicks of Cobb X Cobb breed. The duration of the study was 21 days, with the pre-test period making up days 0-4 and the test period making up days 5-21. The concentration of phosphorous in the P-deficient basal diet was 0.12% available P, with supplemental phosphorous treatments per product of 0.28%, 0.33% and 0.38% of available P, to provide total available P levels of 0.40%, 0.45%, and 0.50%. It is generally recognized that available P requirements for broiler chick will be in 0.40%-0.50% P range. The number of birds per treatment was 4 cages at 10 birds per cage for a total of 40 birds per treatment. At 21 days, the tibia bone ash was measured for two birds per cage. The test chicks were given Marek's vaccination at the hatchery, and Newcastle and Infectious Bronchitis vaccinations upon arrival at the research facility.

The reference standard phosphate product was calcium phosphate dibasic dehydrate ($CaHPO_4 \cdot 2H_2O$; Molecular weight=172.09). The test feed phosphate products included Biofos®, Multifos®, MCP with soda ash and 2.86% supplemented Si, and MCP with caustic soda and 2.63% supplemented Si. Table 5 illustrates the nutrient composition of each of the evaluated products as well as the reference standard:

TABLE 5

Nutrient Composition

| Product | Phosphorus | Calcium | Sodium | Silica |
|---|---|---|---|---|
| Ref. Standard | 18.41% | 23.00% | 0 | 0 |
| Biofos ® | 21.0% | 15.5% | 0 | 0 |
| Multifos ® | 18.0% | 30.0% | 4.80% | 0 |
| MCP/Soda Ash | 20.8% | 15.8% | 3.70% | 2.86% |
| MCP/Caustic Soda | 21.1% | 15.6% | 3.80% | 2.63% |

The biological value, or phosphorous bioavailability (P bv) was calculated using the following formula:

$$P\ bv = \{(G/10) + \%\ Ash + (10 \times G/F)\};\ \text{where}$$

G=average body weight; F=feed consumption; and G/F=feed conversion. The relative bioavailability is then calculated by: P bv (tested source)/P bv (standard)×100. The following Table 6 illustrates the relative bioavailability of each test feed phosphate:

TABLE 6

Relative bioavailability

| Product | Relative Bioavailability |
|---|---|
| Ref. Standard | 100.0% |
| Biofos ® | 100.7% |
| Multifos ® | 100.4% |
| MCP/Soda Ash | 100.3% |
| MCP/Caustic Soda | 100.9% |

Body weights, feed conversion, mortality, and bone mineralization for tested treatments were within expected norms. All of the tested feed phosphates performed similar to or better than the reference standard, suggesting that all formulas, including the new MCP/soda ash and MCP/caustic soda formulations are highly bioavailable, similar to the existing Multifos® and Biofos® products.

Feed Milling Performance Evaluation #2

An additional feed milling performance evaluation was conducted comparing different feed formulations including Broiler Starter diet, Broiler Grower diet (as above), and Broil Finisher diet. A base feed diet containing no inorganic phosphorous was the base line. Each diet was then supplemented with Multifos®, or with a MCP/Soda Ash product similar to the one from the above feed milling and bioavailability studies.

The MCP/Soda Ash product used in the study has a minimum phosphorous content of about 19.0%, a calcium content from about 15.0 to about 17.0%, a sodium content from about 4.0 to about 5.0%, and a maximum fluorine content of about 0.19%. The bulk density (loose) is about 61-68 lbs/ft$^3$, while the bulk density (packed) is about 67-71 lbs/ft$^3$. The angle of repose is about 29-31 degrees. A typical sieve analysis (U.S.) is about 99% passing 12 mesh, about 95% passing 16 mesh, about 90% passing 20 mesh, and about 5% passing 100 mesh. A typical Tyler sieve analysis is about 99% passing 12 mesh, about 95% passing 14 mesh, about 90% passing 20 mesh, and about 5% passing 100 mesh.

Table 7 illustrates the feed milling results of each feed with each supplement.

TABLE 7

Effect on Parameters

| Product | No Inorganic P | Multifos ® supplement | MCP/Soda Ash Supplement |
|---|---|---|---|
| Diet: Broiler Starter | | | |
| Feed Prod./Hr | 1390 lbs | 2201 lbs | 2199 lbs |
| Lbs./HP * Hr | 146 lbs | 262 lbs | 251 lbs |
| Horse Power | 9.54 | 8.41 | 8.75 |
| PDI | 89% | 64% | 61% |
| Modified PDI | N/A | N/A | N/A |
| Pellet Temp. (Cond.) | 180 F. | 181 F. | 181 F. |
| Pellet Temp. | 192 F. | 188 F. | 188 F. |
| Diet: Broiler Grower | | | |
| Feed Prod./Hr | 1563 lbs | 2303 lbs | 2321 lbs |
| Lbs./HP * Hr | 191 lbs | 299 lbs | 285 lbs |
| Horse Power | 8.18 | 7.71 | 8.15 |
| PDI | 89% | 71% | 72% |
| Modified PDI | N/A | N/A | N/A |
| Pellet Temp. (Cond.) | 184 F. | 185 F. | 184 F. |
| Pellet Temp. | 192 F. | 188 F. | 189 F. |
| Diet: Broiler Finisher | | | |
| Feed Prod./Hr | 2026 lbs | 2420 lbs | 2395 lbs |
| Lbs./HP * Hr | 256 lbs | 312 lbs | 398 lbs |
| Horse Power | 7.91 | 7.75 | 8.03 |
| PDI | 81% | 67% | 70% |
| Modified PDI | N/A | N/A | N/A |
| Pellet Temp. (Cond.) | 183 F. | 184 F. | 184 F. |
| Pellet Temp. | 187 F. | 186 F. | 187 F. |

As the data shows, the Broiler Starter, Grower, and Finisher feeds supplemented with the MCP composition has similar performance to each feed supplemented with Multifos®. Each of the supplements performed significantly better than treatment devoid of an inorganic phosphorous source.

Furthermore, the body weights, feed intake, feed conversion (animal's efficiency in converting feed mass into increased body mass, calculated as defined above), and mortality rate for broiler chickens fed feed with no inorganic phosphorous, feed supplemented with Multifos®, and feed supplemented with the MCP composition were not statistically significant or different (p-value>0.05) after 49 days of age, as illustrated in Table 8.

TABLE 8

Effect on Body Wt., Feed Intake, Feed Conversion, and Morality (49 days of age)

| | No Inorganic P | Multifos ® supplement | MCP/Soda Ash Supplement | P-value |
|---|---|---|---|---|
| Body weight (lbs) | 7.319 | 7.566 | 7.310 | 0.6624 |
| Feed intake (lbs) | 12.639 | 13.205 | 12.621 | 0.3370 |
| Feed conversion | 1.76 | 1.77 | 1.78 | 0.7593 |
| Mortality (%) | 12.50 | 12.13 | 12.13 | 0.9897 |

The present invention may be embodied in other specific forms without departing from the essential attributes thereof; therefore, the illustrated embodiments should be considered in all respects as illustrative and not restrictive.

What is claimed is:

1. A granulated phosphate feed ingredient composition for use as a feed ingredient in pelleted animal feed, the composition comprising:
a phosphate source comprising a combination of monocalcium phosphate and dicalcium phosphate;
a lubricity additive comprising a sodium compound present in an amount that provides a sodium content of about one to about ten percent by weight of the composition; and
an abrasive additive.

2. The granulated phosphate feed ingredient composition of claim 1, wherein the sodium compound is chosen from sodium carbonate, sodium hydroxide, monosodium phosphate, and combinations thereof.

3. The granulated phosphate feed ingredient composition of claim 1, wherein the granulated phosphate feed ingredient comprises a phosphorous content of at least about eighteen percent by weight of the composition.

4. The granulated phosphate feed ingredient composition of claim 1, wherein the sodium content comprises from about three to about five percent by weight of the composition.

5. The granulated phosphate feed ingredient composition of claim 1, wherein the abrasive additive comprises silica in an amount of about one to about ten percent by weight of the composition.

6. A granulated phosphate feed ingredient composition for use as a feed ingredient in pelleted animal feed, the composition comprising:
a phosphate source comprising a combination of monocalcium phosphate and dicalcium phosphate; and
an abrasive additive in an amount of about one to about ten percent by weight of the composition.

7. The granulated phosphate feed ingredient composition of claim 6, wherein the abrasive additive comprises silica.

8. The granulated phosphate feed ingredient composition of claim 6, further comprising a sodium additive, wherein the sodium additive provides a sodium content of about one to about ten percent by weight of the composition, and wherein the sodium additive sodium phosphate during pelleting.

9. The granulated phosphate feed ingredient composition of claim 8, wherein the sodium additive is chosen from sodium carbonate, sodium hydroxide, monosodium phosphate, and combinations thereof.

10. The granulated phosphate feed ingredient composition of claim 6, wherein the granulated phosphate feed ingredient comprises a phosphorous content of at least about eighteen percent by weight of the composition.

11. A granulated phosphate composition for use as a feed ingredient in animal feed, wherein the animal feed is pelleted via a pellet mill, the granulated phosphate composition comprising:
a phosphate source comprising a combination of monocalcium phosphate and dicalcium phosphate;
an abrasive additive, the abrasive additive adapted to scour a die of the pellet mill during pelleting; and
a lubricity additive, wherein the lubricity additive comprises a sodium compound that forms sodium phosphate to lubricate the die during pelleting.

12. The granulated phosphate composition of claim 11, wherein the sodium compound is chosen from sodium carbonate, sodium hydroxide, monosodium phosphate, and combinations thereof.

13. The granulated phosphate composition of claim 11, wherein the sodium compound is present in an amount that provides a sodium content of about one to about ten percent by weight of the composition.

14. The granulated phosphate composition of claim 11, wherein the abrasive additive comprises silica.

15. The granulated phosphate composition of claim 11, wherein the abrasive additive is present in an amount of about one to about ten percent by weight of the composition.

16. The granulated phosphate composition of claim 11, wherein incorporation of the granulated phosphate composition into animal feed produces an efficiency of the pellet mill that is at least one hundred percent of an efficiency of the pellet mill when pelleting the animal feed without incorporated of the granulated phosphate composition.

* * * * *